United States Patent
Norrie et al.

(10) Patent No.: US 12,248,424 B2
(45) Date of Patent: Mar. 11, 2025

(54) SYSTEM AND METHOD FOR GHOST BRIDGING

(71) Applicant: Enfabrica Corporation, Mountain View, CA (US)

(72) Inventors: Thomas Norrie, Mountain View, CA (US); Frederic Vecoven, Mountain View, CA (US); Kiran Seshadri, Mountain View, CA (US); Shrijeet Mukherjee, Mountain View, CA (US); Chetan Loke, Mountain View, CA (US)

(73) Assignee: Enfabrica Corporation, Mountain View, CA (US)

( * ) Notice: Subject to any disclaimer, the term of this patent is extended or adjusted under 35 U.S.C. 154(b) by 0 days.

(21) Appl. No.: 18/447,180

(22) Filed: Aug. 9, 2023

(65) Prior Publication Data

US 2024/0104045 A1 Mar. 28, 2024

Related U.S. Application Data

(60) Provisional application No. 63/396,425, filed on Aug. 9, 2022.

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC .............. G06F 13/4221; G06F 2213/0026
See application file for complete search history.

(56) References Cited

U.S. PATENT DOCUMENTS

| | | | |
|---|---|---|---|
| 6,594,712 B1 | 7/2003 | Pettey et al. | |
| 6,667,974 B1 * | 12/2003 | Shigeta | H04L 61/25 370/428 |

(Continued)

FOREIGN PATENT DOCUMENTS

| | | | |
|---|---|---|---|
| EP | 2768188 A1 | 8/2014 | |
| EP | 3661141 A1 * | 6/2020 | G06F 13/385 |

(Continued)

OTHER PUBLICATIONS

Emulex Corporation. "Emulex provides 10Gb Ethernet Virtual Fabric Adapter 5 for New Lenovo Servers." Business Wire. Dec. 15, 2014 (Dec. 15, 2014) Retrieved on Mar. 7, 2022 (Mar. 7, 2022 from: <https://www.businesswire.com/news/home/20141215005718/en/Emulex-provides-10Gb-Ethernet-Virtual-Fabric-Adapter-5-New-Lenovo-Ervers>entire document.

(Continued)

*Primary Examiner* — Henry Tsai
*Assistant Examiner* — John B Roche
(74) *Attorney, Agent, or Firm* — Goodwin Procter LLP

(57) ABSTRACT

A system for sharing peripheral component interconnect express (PCIe) devices across multiple host servers is disclosed. In some embodiments, a switch includes a plurality of hosts associated with a plurality of hierarchies, one or more endpoints associated with one or more of the plurality of hierarchies, and a switch communicatively connectable to the plurality of hosts and the one or more endpoints. The switch is configured to: receive a transaction layer packet (TLP); determine a policy group identifier based on parsing and processing the TLP; perform packet forward matching based on the policy group identifier and destination fields of the TLP; based on whether the TLP is communicated between the hosts and endpoints in different hierarchies of the plurality of hierarchies, determine whether to edit the (Continued)

TLP using one or more rewrite rules; and forward the TLP to an appropriate destination link.

26 Claims, 10 Drawing Sheets

(56) References Cited

U.S. PATENT DOCUMENTS

| | | | |
|---|---|---|---|
| 7,181,541 | B1 | 2/2007 | Burton et al. |
| 7,293,129 | B2 | 11/2007 | Johnsen et al. |
| 7,937,447 | B1 | 5/2011 | Cohen et al. |
| 8,301,717 | B2 | 10/2012 | Deshpande |
| 8,719,456 | B2 | 5/2014 | Wilkinson |
| 8,917,734 | B1 | 12/2014 | Brown |
| 9,448,901 | B1 | 9/2016 | Aslam et al. |
| 9,684,597 | B1 | 6/2017 | Eiriksson |
| 9,864,519 | B2 | 1/2018 | Meyer et al. |
| 9,934,152 | B1 | 4/2018 | Bryant et al. |
| 10,152,428 | B1 | 12/2018 | Alshawabkeh et al. |
| 10,169,279 | B2 | 1/2019 | Yokoyama |
| 10,447,767 | B2 | 10/2019 | Baptist et al. |
| 10,503,658 | B2 | 12/2019 | Basu et al. |
| 10,778,521 | B2 | 9/2020 | Liguori et al. |
| 2001/0046212 | A1 | 11/2001 | Nakajima |
| 2002/0078271 | A1 | 6/2002 | Berry |
| 2002/0129272 | A1 | 9/2002 | Terrell et al. |
| 2002/0159385 | A1 | 10/2002 | Susnow et al. |
| 2002/0184452 | A1 | 12/2002 | Simmons et al. |
| 2002/0191599 | A1 | 12/2002 | Parthasarathy et al. |
| 2003/0058875 | A1 | 3/2003 | Arndt et al. |
| 2003/0154412 | A1 | 8/2003 | Hetzler et al. |
| 2004/0049603 | A1 | 3/2004 | Boyd et al. |
| 2005/0068798 | A1 | 3/2005 | Lee et al. |
| 2005/0080920 | A1 | 4/2005 | Bender et al. |
| 2005/0089033 | A1 | 4/2005 | Gupta et al. |
| 2005/0223118 | A1 | 10/2005 | Tucker et al. |
| 2006/0004941 | A1 | 1/2006 | Shah et al. |
| 2006/0056405 | A1 | 3/2006 | Chang et al. |
| 2006/0236063 | A1 | 10/2006 | Hausauer et al. |
| 2006/0242352 | A1 | 10/2006 | Torudbakken et al. |
| 2006/0271713 | A1 | 11/2006 | Xie et al. |
| 2007/0038794 | A1 | 2/2007 | Purcell et al. |
| 2007/0104102 | A1 | 5/2007 | Opsasnick |
| 2007/0255802 | A1 | 11/2007 | Aloni et al. |
| 2007/0283123 | A1 | 12/2007 | Vick et al. |
| 2008/0043732 | A1 | 2/2008 | Desai et al. |
| 2008/0168194 | A1 | 7/2008 | Gregg et al. |
| 2009/0083392 | A1 | 3/2009 | Wong et al. |
| 2009/0113143 | A1 | 4/2009 | Domsch et al. |
| 2010/0064070 | A1 | 3/2010 | Yoshimura et al. |
| 2010/0232448 | A1 | 9/2010 | Sugumar et al. |
| 2011/0072234 | A1 | 3/2011 | Chinya et al. |
| 2011/0268119 | A1 | 11/2011 | Pong et al. |
| 2011/0271010 | A1 | 11/2011 | Kenchammana et al. |
| 2013/0024591 | A1 | 1/2013 | Sun |
| 2013/0031328 | A1 | 1/2013 | Kelleher et al. |
| 2013/0132536 | A1* | 5/2013 | Zhang ............... H04L 45/74 709/221 |
| 2013/0318322 | A1 | 11/2013 | Shetty et al. |
| 2014/0237156 | A1 | 8/2014 | Regula et al. |
| 2015/0082000 | A1 | 3/2015 | Hong et al. |
| 2015/0089009 | A1 | 3/2015 | Tsirkin et al. |
| 2016/0070475 | A1 | 3/2016 | Zhang et al. |
| 2016/0085450 | A1 | 3/2016 | Ahn et al. |
| 2016/0162422 | A1 | 6/2016 | Weber |
| 2017/0097909 | A1 | 4/2017 | Simionescu et al. |
| 2017/0132148 | A1 | 5/2017 | Liu et al. |
| 2017/0177520 | A1 | 6/2017 | Kampe et al. |
| 2017/0185528 | A1 | 6/2017 | Hansson et al. |
| 2017/0372088 | A1 | 12/2017 | Zhao et al. |
| 2018/0024938 | A1* | 1/2018 | Paltashev ............ G06F 12/128 711/133 |
| 2018/0198715 | A1 | 7/2018 | Shmilovici et al. |
| 2019/0141041 | A1* | 5/2019 | Bhabbur ............ H04L 9/3228 |
| 2019/0173810 | A1 | 6/2019 | Shpiner et al. |
| 2019/0220425 | A1 | 7/2019 | Zemach et al. |
| 2019/0258415 | A1 | 8/2019 | Imamura |
| 2019/0320019 | A1 | 10/2019 | Hamrick, Jr. |
| 2019/0324917 | A1 | 10/2019 | Cui et al. |
| 2019/0370173 | A1 | 12/2019 | Boyer et al. |
| 2019/0379767 | A1 | 12/2019 | Sharma et al. |
| 2020/0004685 | A1 | 1/2020 | Guim Bernat et al. |
| 2020/0119753 | A1 | 4/2020 | Chirca et al. |
| 2020/0159669 | A1 | 5/2020 | Duncan et al. |
| 2020/0177513 | A1 | 6/2020 | Zhang |
| 2020/0236052 | A1 | 7/2020 | Srinivasan et al. |
| 2020/0280518 | A1 | 9/2020 | Lee et al. |
| 2020/0371955 | A1 | 11/2020 | Goodacre et al. |
| 2020/0387405 | A1 | 12/2020 | Xiao et al. |
| 2021/0019069 | A1 | 1/2021 | Sen et al. |
| 2021/0037107 | A1 | 2/2021 | Klenk et al. |
| 2021/0075633 | A1 | 3/2021 | Sen et al. |
| 2021/0083981 | A1 | 3/2021 | Shmilovici et al. |
| 2021/0232312 | A1 | 7/2021 | Prasad et al. |
| 2021/0234706 | A1 | 7/2021 | Nair et al. |
| 2021/0345112 | A1 | 11/2021 | Elliott et al. |
| 2022/0060422 | A1 | 2/2022 | Sommers |
| 2022/0085916 | A1 | 3/2022 | Debbage et al. |
| 2022/0109587 | A1 | 4/2022 | Sapio et al. |
| 2022/0200906 | A1 | 6/2022 | Ye et al. |
| 2022/0214912 | A1 | 7/2022 | Julien et al. |
| 2022/0217085 | A1 | 7/2022 | Sankar et al. |
| 2022/0222118 | A1 | 7/2022 | Wang et al. |
| 2022/0283964 | A1 | 9/2022 | Burstein et al. |
| 2022/0291875 | A1 | 9/2022 | Diaz-Cuellar et al. |
| 2023/0096451 | A1* | 3/2023 | Johnson ............. G06F 21/71 718/104 |
| 2024/0098023 | A1 | 3/2024 | Guo |

FOREIGN PATENT DOCUMENTS

| | | |
|---|---|---|
| WO | WO-2005106693 A2 | 11/2005 |
| WO | WO-2009120798 A2 | 10/2009 |
| WO | WO-2020055921 A1 | 3/2020 |
| WO | WO-2022108498 A1 | 5/2022 |

OTHER PUBLICATIONS

International Search Report and Written Opinion for International Patent Application No. PCT/US2022/011491, dated Mar. 24, 2022 (8 pages).

International Search Report and Written Opinion for International Patent Application No. PCT/US2022/32841, dated Nov. 21, 2022 (10 pages).

International Search Report and Written Opinion for International Patent Application No. PCT/US2022/74833, dated Dec. 6, 2022 (8 pages).

International Search Report and Written Opinion for International Patent Application No. PCT/US2023/062168, dated May 12, 2023 (54 pages).

International Search Report and Written Opinion for International Patent Application No. PCT/US2023/61405, dated Jul. 11, 2023 (6 pages).

International Search Report and Written Opinion for International Patent Application No. PCT/US2023/082132, dated Jun. 6, 2024 (8 pages).

International Search Report and Written Opinion for International Patent Application No. PCT/US2024/029723, dated Aug. 22, 2024 (14 pages).

International Search Report and Written Opinion for International Patent Application No. PCT/US2023/029887, dated Oct. 26, 2023 (13 pages).

"Using Non-transparent Bridging in PCI Express Systems," by Jack Regula, Jun. 1, 2004, Jun. 1, 2004, pp. 4-30, XP002686987, URL:http://www.plxtech.com/files/pdf/technical/expresslane/NontransparentBridging .pdf.

U.S. Appl. No. 17/570,261, filed Jan. 6, 2022, Server Fabric Adapter for I/O Scaling of Heterogeneous and Accelerated Compute Systems, Rochan Sankar, et al.

(56) References Cited

OTHER PUBLICATIONS

U.S. Appl. No. 18/778,611, filed Jul. 19, 2024, Server Fabric Adapter for I/O Scaling of Heterogeneous and Accelerated Compute Systems, Rochan Sankar, et al.
U.S. Appl. No. 18/747,118, filed Jun. 18, 2024, Optimally Balanced Network Systems, Rochan Sankar, et al.
U.S. Appl. No. 17/836,532, filed Jun. 9, 2022, Transparent Remote Memory Access Over Network Protocol, Thomas Norrie, et al.
U.S. Appl. No. 18/755,372 filed Jun. 26, 224, Transparent Remote Memory Access Over Network Protocol, Thomas Norrie, et al.
U.S. Appl. No. 17/886,026, filed Aug. 11, 2022, System and Method For Congestion Control Using a Flow Level Transmit Mechanism, Shrijeet Mukherjee et al.
U.S. Appl. No. 18/102,033, filed Jan. 26, 2023, System and Method for One-Sided Read Rma Using Linked Queues, Shrijeet Mukerjee, et al.
U.S. Appl. No. 18/107,324, filed Feb. 8, 2023, System and Method for Using Dynamic Thresholds With Route Isolation for Heterogeneous Traffic in Shared Memory Packet Buffers, Ari Aravinthan, et al.
U.S. Appl. No. 18/666,548, filed May 16, 2024, System and Method for an Optimized Staging Buffer for Broadcast/Multicast Operations, Shrijeet Mukherjee, et al.
U.S. Appl. No. 18/526,727, filed Dec. 1, 2023, A Modular Datacenter Interconnection System, David Skirmont, et al.
U.S. Appl. No. 18/785,542, filed Jul. 26, 2024, Method and System for Tracking and Moving Pages Within a Memory Hierarchy, Shrijeet Mukhrjee, et al.
U.S. Appl. No. 18/920,558, filed Oct. 18, 2024, System and Method for Optimally Balanced Network Multipathing, Shrijeet Mukhrjee, et al.

* cited by examiner

SYSTEM AND METHOD FOR GHOST BRIDGING

CROSS REFERENCE TO RELATED APPLICATION

This application claims the benefit of U.S. Provisional Patent Application No. 63/396,425, filed Aug. 9, 2022, the entire contents of which are incorporated by reference herein.

TECHNICAL FIELD

This disclosure relates to a switch system that enables device sharing and disaggregation across multiple servers using a ghost bridging approach in a peripheral component interconnect express (PCIe) environment.

BACKGROUND

PCIe is a serial computer expansion bus standard that is widely used in seamless data processing requiring high-speed, high-bandwidth, low-latency solutions, etc. PCIe is based on point-to-point topology, in which separate serial transmit and receive links are used to connect PCIe devices (e.g., endpoint devices, host servers). Typically, a PCIe hierarchy is a tree that fans out of a single root port. This root port is commonly connected to a central processing unit (CPU) socket. Therefore, all devices on the PCIe hierarchy are available or accessible only to a single host server through this single root port (unless the CPU sockets share coherent memory using a coherency protocol, which can form a multi-socket server). This single host bridging restriction has made it difficult to share PCIe hardware components (e.g., endpoint devices) across multiple servers, thereby frustrating the disaggregated system development and reducing utilization efficiency.

The PCIe specification previously defined a set of features termed multi-root input/output virtualization (MR-IOV) to enable PCIe endpoints to operate in multiple PCIe hierarchies. MR-IOV, however, has been deprecated due to a lack of traction in ecosystems. Moreover, although prior PCIe switches may have controls for address translation and routing flexibility, these switches usually are not a comprehensive end-to-end system for disaggregating PCIe devices across multiple host servers.

SUMMARY

To address the aforementioned shortcomings, a system for sharing peripheral component interconnect express (PCIe) devices across multiple host servers is provided. In some embodiments, a switch includes a plurality of hosts associated with a plurality of hierarchies, one or more endpoints associated with one or more of the plurality of hierarchies, and a switch communicatively connectable to the plurality of hosts and the one or more endpoints. The switch is configured to: receive a transaction layer packet (TLP); determine a policy group identifier based on parsing and processing the TLP; perform packet forward matching based on the policy group identifier and destination fields of the TLP; based on whether the TLP is communicated between the hosts and endpoints in different hierarchies of the plurality of hierarchies, determine whether to edit the TLP using one or more rewrite rules; and forward the TLP to an appropriate destination link as if it was locally originated on that link by a "ghost" device.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
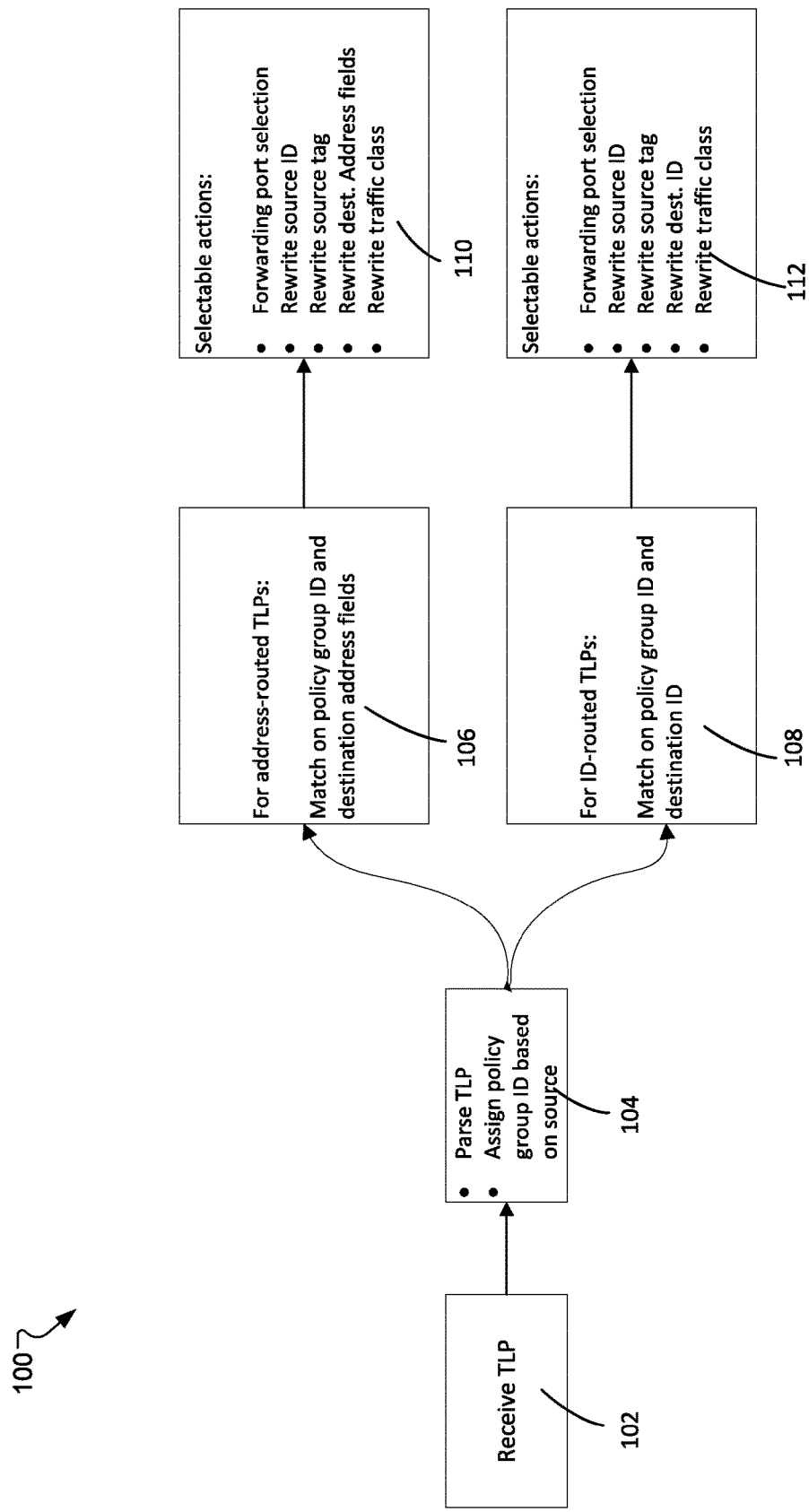
FIG. 1 illustrates an exemplary logical diagram of a PCIe switch for sharing and disaggregating a peripheral device across multiple servers, according to some embodiments.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Using a point to multi-point topology, PCIe can be used to connect a CPU of a computer server to peripheral hardware. The computer or host server, typically a root complex (RC) device, is the root of the PCIe topology that connects with the CPU and memory. An endpoint device or endpoint is a peripheral device that resides at the bottom of the topology and implements a single upstream port toward the RC device. For example, an endpoint may be a hard disk drive host adapter, a solid state device (SSD), a graphics processing unit (GPU), an Ethernet network adapter, etc. An endpoint does not have a connection with the CPU or memory. A PCIe bus link supports full-duplex communication between any two endpoint devices.

PCIe has numerous improvements over the prior standards, including higher maximum system bus throughput, lower I/O pin count, smaller physical footprint (e.g., small, better performance scaling for bus devices, support for advanced error detection and reporting mechanism, and native hot-swap functionality. PCIe, however, faces significant challenges. For example, PCIe has been perceived as a single-host interconnect technology, which limits the usage of PCIe, e.g., in switch fabrics of small and medium-sized clusters.

PCI special interest group (PCI-SIG) first released the single-root IOV (SR-MY) specification that enables sharing of a single physical resource (e.g., a network interface card (NIC) or a host bus adapter (HBA)) in a PCIe system among multiple software interfaces running on one physical host server (e.g., a single RC device). That is, SR-IOV allows a single device to be exposed to multiple virtual machines on a single physical host. Based on SR-IOV, PCI-SIG then built MR-IOV to extend the use of PCIe technology from a single-host domain to a multi-root (i.e., multi-host) domain. MR-IOV allows complex device sharing schemes where a single PCIe endpoint can be shared across multiple hosts but does so by placing additional requirements on the endpoints and switches. The complexity and manageability of MR-IOV switches and endpoints thus make the implementation of MR-IOV standards extremely difficult. No single vendor has the capabilities and commitment to develop a completely seamless solution.

Current PCIe switch systems may be able to expand a limited number of PCIe interfaces such that more PCIe interfaces will be available for a host to support more endpoint devices. Such PCIe interfaces provide link-level reliability between endpoint devices; however, there is no end-to-end reliability protocol in a switched PCIe network. Therefore, current PCIe switches lack the ability of disaggregating PCIe devices across hosts in an end-to-end system, and thus also do not provide a feasible end-to-end solution for multi-host interconnect in a PCIe hierarchy.

The present system described in this disclosure includes a PCIe switch that enables sharing and disaggregation of PCIe components across multiple host servers. When enabling the use of a single I/O device (e.g., an endpoint) by multiple hosts (e.g., RC devices) simultaneously, the present system does not require any modifications to be made in the endpoints while allowing fine-grain sharing of device resources across multiple servers.

System Overview

PCIe communication takes the form of packets transmitted over dedicated lines, with flow control, error detection, and retransmissions. For example, when a CPU writes a 32-bit word to a PCIe peripheral, an RC may generate a memory write packet for transmission over the PCIe bus. A packet includes one or more headers and a payload of the one 32-bit word to be written. The packet is then transmitted to a PCIe port directly coupled to the target peripheral or is passed to a switch to be routed to the target peripheral. Either way, the packet is routed to the peripheral, decoded, and executed to perform the desired write operation. The underlying communications mechanism in PCIe packet transmission includes a transaction layer, a data link layer, and a physical layer. The packet that relates to PCIe's uppermost layer is a transaction layer packet (TLP). A TLP represents the packet format used for end-to-end communication in PCIe, which will be detailed below in this disclosure.

In some embodiments, the present system is designed to configure a device in one server, e.g., to "home" the device in the server, and allow parts of the device resources to be shared across multiple other servers. To achieve this device sharing function, a PCIe switch may parse incoming TLPs and route the TLPs unmodified to an appropriate destination link. It should be noted that the present system does not place requirements or modifications on the TLPs, and thus is different from MR-IOV which needed the TLP's to be modified.

In some embodiments, the PCIe switch described herein may provide enhancements for parsing and processing TLPs. For example, the present PCIe switch can match more fields of an incoming TLP against a large number of match configs, thereby facilitating routing the TLP to an appropriate destination link. The present PCIe switch may also take a broader set of actions based on the identified winning match config, including editing the TLP, thereby adjusting and optimizing operation rules (e.g., rewrite rules) and thus enhancing the end-to-end communication.

In some embodiments, the present PCIe switch may perform the following actions:
Identifying which port to forward the TLP;
Rewrite rules for the source identifier (ID) and tag;
Rewrite rules for the destination address or device ID;
Rewrite rules for a traffic class of the TLP.

Altogether the features of the PCIe switch described herein enable fine-grained control, e.g., regarding different ways that different TLPs can be forwarded and edited. In some embodiments, these controls can further be used to edit TLPs such that unmodified external RCs and endpoints can interact effectively with each other across multiple PCIe hierarchies to improve system disaggregation. These features and working mechanisms associated with a PCIe switch will be detailed below with reference to FIGS. 1-9.

In some embodiments, the aforementioned features of the PCIe switch may be used alone to allow downstream endpoint virtual functions to be distributed to multiple upstream hosts, as described below in example use case 2 of FIG. 4. A connection to reach an endpoint is downstream, and a connection to reach an RC device is upstream. These features may also be used in conjunction with a set of complementary features to allow a CPU to implement the functionality PCIe endpoint, as described below in example use case 1 of FIG. 3.

Basic Features of PCIe Switch

Figure 2:
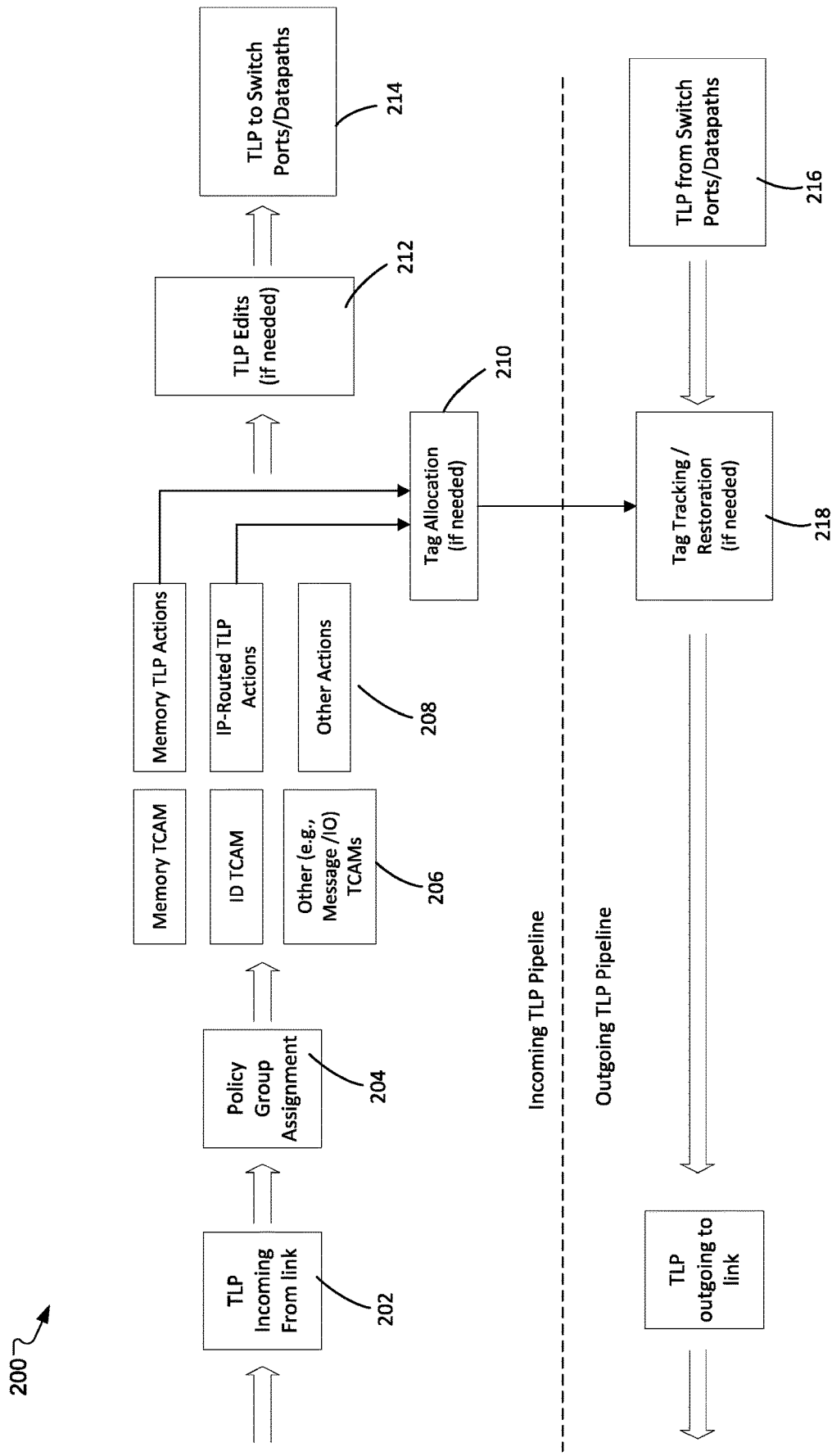
FIG. 2 illustrates an exemplary structural diagram of a PCIe switch for implementing device sharing and disaggregation across multiple servers with TCAM, according to some embodiments.

FIG. 1 depicts an example logical diagram 100 of a PCIe switch for sharing and disaggregating a peripheral device across multiple host servers. FIG. 2 depicts a structural diagram 200 of a PCIe switch for implementing device sharing and disaggregation with ternary content addressable memory (TCAM). The basic features of the present PCIe switch, as well as some complementary features (e.g., to enable CPU-implemented endpoints), will be described hereafter with reference to these figures.

Policy Group Identification

As shown in FIG. 1, a PCIe switch receives a TLP at step 102. For example, the TLP is a CPU read or write request, and the present PCIe switch may forward this incoming TLP, typically unmodified, to an appropriate link connected to a destination device.

A common approach to performing packet forwarding is that a PCIe switch parses out a destination ID or address field from the received TLP and maps the parsed ID or address field to an output port. Each output port may contain a contiguous range of IDs or addresses. The present PCIe switch, however, may enhance the functionality of packet forwarding by supporting different policies depending on the TLP source IDs. In some embodiments, the present PCIe switch may perform policy mapping based on TLP source IDs. A source refers to the PCIe component that created the TLP, e.g., a requester for a non-posted request or a completer for a completion. A source ID is identified in one or more TLP source fields associated with the TLP. In some embodiments, the source ID is a 16-bit field, and may further be extended by additional sources, e.g., with other identifying fields such as PCIe process address space ID (PASID) or other similar structures.

At step 104, the present PCIe switch parses the received TLP and identifies and assigns a policy group ID for the TLP, e.g., based on the source of the TLP. The present PCIe switch may perform packet forwarding based on a direct mapping of the source ID and/or destination address/ID in a matching step (as described below). This, however, can be inefficient since many different source IDs may be treated with a similar policy. To improve efficiency with a limited match scale, in some embodiments, the present PCIe switch may compress the source ID (e.g., 16 bits) into a policy ID with a fewer number of bits (e.g., 5 bits), and then perform packet forward matching based on the policy ID.

In some embodiments, a mapping function is applied to convert an input source ID into a policy group ID. For example, a mapping function may be a 1:1 source ID to policy group ID lookup within a bounded range. A default policy group ID is applied when the source ID is outside the bounded range. In another example, a set of ranges and strides may be configured and used to apply a transformation from the source ID to the policy group ID based on a predefined function. This approach supports contiguous or strided source IDs between a given range. In an extreme example, the 16-bit source ID could be mapped 1:1 to a 16-bit policy group ID.

Match Based on Destination Fields and Policy Group ID

The present PCIe switch routes a TLP based on the identified TLP data including both destination fields and policy group ID. For an address-routed TLP, the PCIe switch may perform matching based on the identified policy group ID and destination address field, as shown in 106 of FIG. 1. For an ID-routed TLP, the PCIe switch may perform matching based on the identified policy group ID and destination ID, as shown in 108 of FIG. 1.

Figure 5:
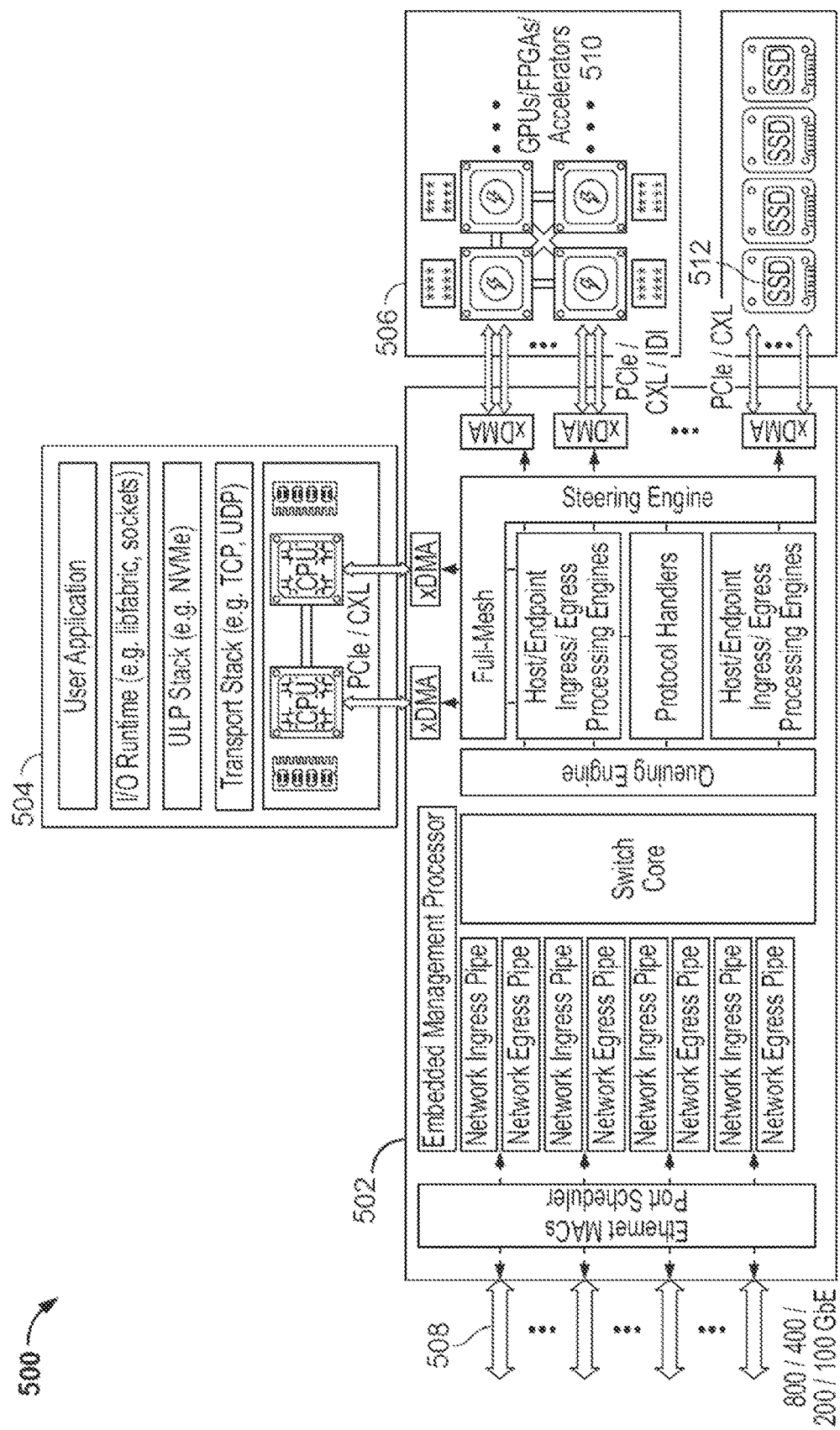
FIG. 5 illustrates an exemplary server fabric adapter architecture for accelerated and/or heterogeneous computing systems in a data center network, according to some embodiments.

In some embodiments, a content addressable memory (CAM) may be used to match an appropriate destination field concatenated with the policy group ID. The destination field may be a destination address or a destination ID depending on the type of TLP. In some embodiments, based on the highest priority match, the PCIe switch may determine an associated set of actions (as described below in action steps 110 and 112). CAM receives the data stored at a memory location (i.e., memory contents) and returns the address that matches the highest priority (if any), i.e., the address where the data is stored. In contrast, static random access memory (SRAM) performs an inverse operation, that is, returning the memory contents when provided with a memory address. In other embodiments, a ternary content addressable memory (TCAM) may be used in the matching steps 106, 108 in FIG. 1 and/or step 206 of FIG. 2, where the memory contents to look up may have an unknown state, forming a wildcard match on a given bit. TCAM allows searches on long matches and is powerful in fast lookups. The present CAMs are labeled as "xDMA" in FIG. 5 depicted below.

Enhanced Actions of PCIe Switch

As depicted in steps 110 and 112 of FIG. 1, the PCIe switch determines and takes one or more specific actions once the destination field concatenated with the policy group ID has been matched. A primary action taken by the PCIe switch is forwarding the TLP without modification to an appropriate port, e.g., the action of "forwarding port selection" in FIG. 1. This action is usually defined by switch configuration.

In addition to the primary packet forwarding action, the present PCIe switch may also support an enhanced action set. In some embodiments, the enhanced action set may include one or more rewrite rules that can be used to adjust source and destination fields. In some embodiments, the rewrite rules may include:

Rewriting a source ID (e.g., the requester ID for a non-posted request);
Rewriting a source tag (because the source ID and tag form a full transaction ID, this rule combined with the above source ID rewrite rule enables full transaction ID rewriting);
Rewriting a destination address, including rewriting address related fields such as "Address Type" bits or PASID fields;
For ID-routed TLPs, rewriting a destination ID; and
Rewriting the traffic class of the TLP.

In some embodiments, the present PCIe switch may perform source ID rewriting or destination ID rewriting by remapping an input ID to a new output ID. This can be implemented over contiguous ranges or strided ranges to ensure each rewrite rule is more efficient, for example, to make the rule applicable to more TLPs.

In some embodiments, the rewrite rules may also include rewriting a source tag. Tag rewriting is useful to keep track of original tags and source IDs for non-posted requests. An operation that consists of only a request without requiring a response/completion is a posted operation (e.g., a write operation). An operation that consists of request and completion, i.e., requiring a completion/response to a request, is a non-posted operation (e.g., a read operation). A non-posted request requires the return of a later completion, and this completion is associated with the tag and source ID of the original request tracked by the tag rewriting.

FIG. 2 illustrates an exemplary structural diagram 200 of a PCIe switch for implementing device sharing and disaggregation across multiple servers with TCAM. The figure includes an incoming TLP pipeline and an outgoing TLP pipeline. Referring now to the incoming TLP pipeline of FIG. 2, subsequent to receiving a TLP at 202, assigning a policy group ID to the TLP at 204, and matching the TLP to an output port at 206 (e.g., using TCAM), the present PCIe switch takes actions (e.g., rewriting) at 208. As depicted, tag rewriting may involve tag allocation at 210, e.g., allocating a new tag from a free list. The list is used as an index of a structure, and the structure stores the original tag and source ID. Using this tag rewriting, an unpredictable source ID of the non-posted TLP may be rewritten. Since tags are allocated by the originator, it is hard to predict the range of source IDs in flight. The tag rewrite can make the actual source ID predictable and further enable collapsing and sharing of IDs, thereby eliminating the risk of being unable to recover the original unpredictable source ID later when the PCIe switch rewrites the completion. Because the tag rewriting allocates tags from a new tag space, it also enables multiple source requesters to share a single source ID. This is particularly useful for collapsing a large number of requester IDs into a single bridge device ID.

The TLP may be edited in 212, e.g., based on the rewriting and other actions, and then be moved or forwarded to a specific switch port in 214. In contrast, when the PCIe switch receives a TLP from a switch port in 216, it may perform tag tracking to restore the tag and source ID of the original request in 218 for end-to-end communication.

Referring back to FIG. 1, for an address-routed TLP, the rewrite rules may include rewriting a destination address in step 110. In some embodiments, address rewriting involves remapping an input address to a new output address. Typically, the PCIe switch adds an offset to the input/incoming address and applies bounds checks.

The other rewrite rules include traffic class rewriting as shown in 110 and 112. In some embodiments, the PCIe switch performs traffic class writing by changing the traffic class designation of an incoming TLP to a new traffic class designation on an outgoing TLP. This can be useful for avoiding protocol-related deadlock (e.g., a type of network-wide congestion) when a TLP is forwarded from one RC to another RC.

Complementary Features to Enable CPU-Implemented Endpoints

To share PCIe devices across multiple hosts, a CPU host may be configured to present itself as a PCIe endpoint to other CPU hosts. Along with the aforementioned basic features shown in FIGS. 1 and 2, the present PCIe switch may include complementary features that are useful for allowing a CPU to behave like a PCIe endpoint, i.e., a CPU-implemented endpoint. These complementary features at least include a programmable PCIe configuration space, a cross-hierarchy DMA engine, PCIe interrupts generation triggered by a host/RC, a log of memory space writes, etc. An example CPU-implemented endpoint will be described below in FIG. 3.

Programmable PCIe Configuration Space

Exposing ghost devices requires that a PCIe switch generate appropriate responses to configuration reads and writes from an RC that target those ghost devices. A ghost device, as described below, is a specifically-configured intermediate device used in certain types of TLP transmissions. In some cases, e.g., in example use case 2 of FIG. 4 described below, these configuration accesses, e.g., ID-routed TLPs of the reads and writes, may be matched, edited, and forwarded directly to the real downstream device using the mechanisms defined above. However, in other cases, these configuration accesses may need to be intercepted and processed using a programmable software layer that implements an intended policy. In some embodiments, this processing using the programmable software layer may at least include generating additional configuration reads and writes to downstream devices and handling subsequent completions.

Cross-Hierarchy DMA Engine

PCIe endpoint devices can perform large efficient reads or writes using direct memory access (DMAs), i.e., PCIe endpoints can access the CPU's memory directly. In some embodiments, the present PCIe switch (e.g., a server fabric adapter shown in FIG. 5) may include a DMA engine (not shown) to improve the ability of a CPU to behave like an endpoint device. The DMA engine may move data between the local addresses of the PCIe switch and any arbitrary addresses on any PCIe tree it needs to operate on, bounded by appropriate security controls.

Interrupt Generation

PCIe endpoint devices can generate interrupts (e.g., message signaled interrupts (MSI) or MSI-X interrupts) to CPUs to indicate that there is a task to be done. To improve the ability of a host CPU to behave like an endpoint device, it is helpful to provide the host CPU with the ability to trigger PCIe interrupts on other hosts.

Write Activity Log

PCIe endpoint devices typically have hardware datapaths or ports that can efficiently track and act on PCIe write traffic (e.g., a CPU writing a doorbell to a device). A CPU-implemented endpoint, however, is not notified of PCIe writes to its memory space. As a result, the CPU-implemented endpoint would need to poll writable locations to look for additional tasks. To improve the CPU efficiency, in some embodiments, the present PCIe switch may provide a log of memory space writes that have occurred to that host CPU.

For example, the present PCIe switch may support a large memory-based queue in the CPU's memory. This queue has a list of addresses and lengths of received DMA writes or optionally DMA reads. Upon receiving the list, the CPU can inspect the list and identify any locations that may have a changed value. The CPU can then act on the identified locations appropriately. In addition, new entries in this log can trigger an interrupt to the CPU, thereby efficiently notifying the CPU that there is a task to be done. When this log fills up, there may be various responses. In some embodiments, these responses can be stalling incoming traffic if there is a guarantee of eventual forward progress, or alternatively dropping new traffic notifications with an indication that the activity log is not a complete account of all activity and requires that the CPU return back to a polling mode to observe all possible changes.

Enabled Transaction Transformation Primitives

When the present PCIe switch is configured with basic and complementary features, these features along with the mechanisms defined above can be used to create a set of useful ghost transactions that enable bridging individual PCIe transactions across independent PCIe hierarchies. In some embodiments, a ghost transaction is a transaction that bridges through a ghost device. A ghost device is a PCIe device that behaves as a proper PCIe device but does not itself implement any mission-mode device functionality. Instead, the ghost device merely operates as a front end for other external devices. In some embodiments, the ghost device is used to provide device IDs, memory space, and tag space for PCIe TLPs that bridge between PCIe hierarchies.

A non-exhaustive list of useful building blocks transform primitives are described below, with respect to ghost writes and ghost reads.

Ghost Writes
    Convert from: A memory write received on a port in an initiator PCIe hierarchy to an address in that PCIe hierarchy (e.g., targeting base address register (BAR) space on a ghost device or general system memory address)
    Convert to: A memory write to an address in a target PCIe hierarchy that is sourced from a target ghost device Mechanism:
  Match: Address range to be transformed in the source PCIe hierarchy
  Actions:
    Rewrite source ID to target ghost device ID
    Rewrite destination address to target address
    Optionally rewrite the traffic class if initiating write was from a CPU and the target write is toward a CPU (to assist in breaking deadlock).

Ghost writes allow PCIe hardware (e.g., a host CPU or RC) in an initiating/source PCIe hierarchy to write to an address in a different target PCIe hierarchy. For example, the present PCIe switch receives a first write TLP from the RC to a first address. Both the RC and the first address are in the same initiating hierarchy. The first address may be targeting BAR space on a ghost device or a general system memory address within the initiating hierarchy.

The present PCIe switch performs matching on the first write TLP based on the first address and source RC (e.g., including policy group ID associated with the source RC). Depending on the matching, the PCIe switch may then convert the first write TLP into a second write TLP by rewriting the source ID and the destination address. For example, the PCIe switch may change the source ID from the source RC to a target ghost device ID in the initiating/source PCIe hierarchy (e.g., a ghost control plane EP in FIG. 3 described below), as if the second write TLP originates from a ghost device. The PCIe switch may also rewrite the destination address of the second TLP as a second address in the target PCIe hierarchy. In some embodiments, the present PCIe switch may further rewrite the traffic class of the second write TLP, e.g., to accelerate deadlock breaking.

Because ghost devices are paired/mapped to enable bridging independent PCIe hierarchies, ghost transactions may be conducted through ghost devices to help connect the real hosts and endpoints in different PCIe trees or hierarchies.

Ghost Reads

1. Read Request
  Convert from: A memory read received on a port in an initiating PCIe hierarchy to an address in that hierarchy (e.g., targeting BAR space on a ghost device or general system memory address)
  Convert to: A memory read from a target ghost device to a memory address in a target PCIe hierarchy
  Mechanism:
    Match: Address range to be transformed in the source PCIe hierarchy
    Actions:
      Rewrite source ID to target ghost device ID
      If initiating source has a predictable source ID and a 1:1 tag space shared with the target ghost device, the target tag can be kept the same as the initiating tag (i.e., no rewrite)
      Otherwise, rewrite the source tag to be a new target tag that can be later associated in the completion back to the initiating source ID and tag
      Rewrite destination address to target address
      Optionally rewrite the traffic class if initiating read was from a CPU and the target read is toward a CPU (to assist in breaking deadlock)

2. Completion
  Convert from: A read completion received on a port in the target PCIe hierarchy for an earlier ghost read in the target PCIe hierarchy
  Convert to: A read completion in the initiating PCIe hierarchy for an earlier ghost read in the initiating PCIe hierarchy
  Mechanism:
    Match: Policy Group ID (derived from Completer ID), destination ID (requester ID from TLP), or a combination of both as required to recover the appropriate Initiator Requester ID, Completer ID, and tags
    Actions:
      Rewrite source ID (Completer ID) to initiator ghost device ID
      Rewrite source tag to original requester ID from the original read request (potentially by indexing into a tag structure with the allocated tag rewritten into the initial read request)
      Rewrite destination ID (requester ID) to original requester ID from the original read request (potentially by indexing into a tag structure with the allocated tag rewritten into the initial read request)

Ghost reads allow PCIe hardware (e.g., a host CPU or RC) in an initiating/source PCIe hierarchy to read memory content from a memory address in a different target PCIe hierarchy. Memory read is a non-posted operation that includes (1) a read request and (2) a completion to the request. When receiving (1) the ghost read request in the initiating PCIe hierarchy, the PCIe switch regenerates a read request in the target PCIe hierarchy by rewriting the source ID with a target ghost device ID in the initiating PCIe hierarchy, rewriting the destination address with an address in the target PCIe hierarchy, and optionally rewriting the traffic class. This is similar to the above-discussed ghost write. However, different from the handling of the ghost write, the PCIe switch may rewrite the source tag associated with the read request.

In some embodiments, if the initiating source has a predictable source ID and a 1:1 tag space has been shared with the target ghost device, the PCIe switch may not rewrite the source tag, that is, keeping the target tag the same as the initiating tag. The source IDs of host CPUs are generally unpredictable, and thus the PCIe switch will rewrite the source tag when the read request was initiated from a host CPU. The PCIe switch may rewrite the source tag to be a new target tag. This new target tag, when used in the completion, may be associated back to the initiating tag and source ID.

Moving to the (2) completion to respond to the above ghost read, the PCIe switch receives a read completion in the target PCIe hierarchy and converts it into a new completion request in the initiating PCIe hierarchy using the rewrite rules. Essentially, the source ID, the source tag, and the destination ID of the new completion request are all rewritten to the original identifiers associated with the original request in the initiating PCIe hierarchy such that a normal PCIe transaction within the same hierarchy can be performed.

System Examples

Example Use Case 1: CPU-Implemented Endpoints

One way to share PCIe devices across multiple hosts is by having a CPU host present itself as a PCIe endpoint to other CPU hosts, and then distributing the backend implementation to a collection of real PCIe devices.

Figure 3:
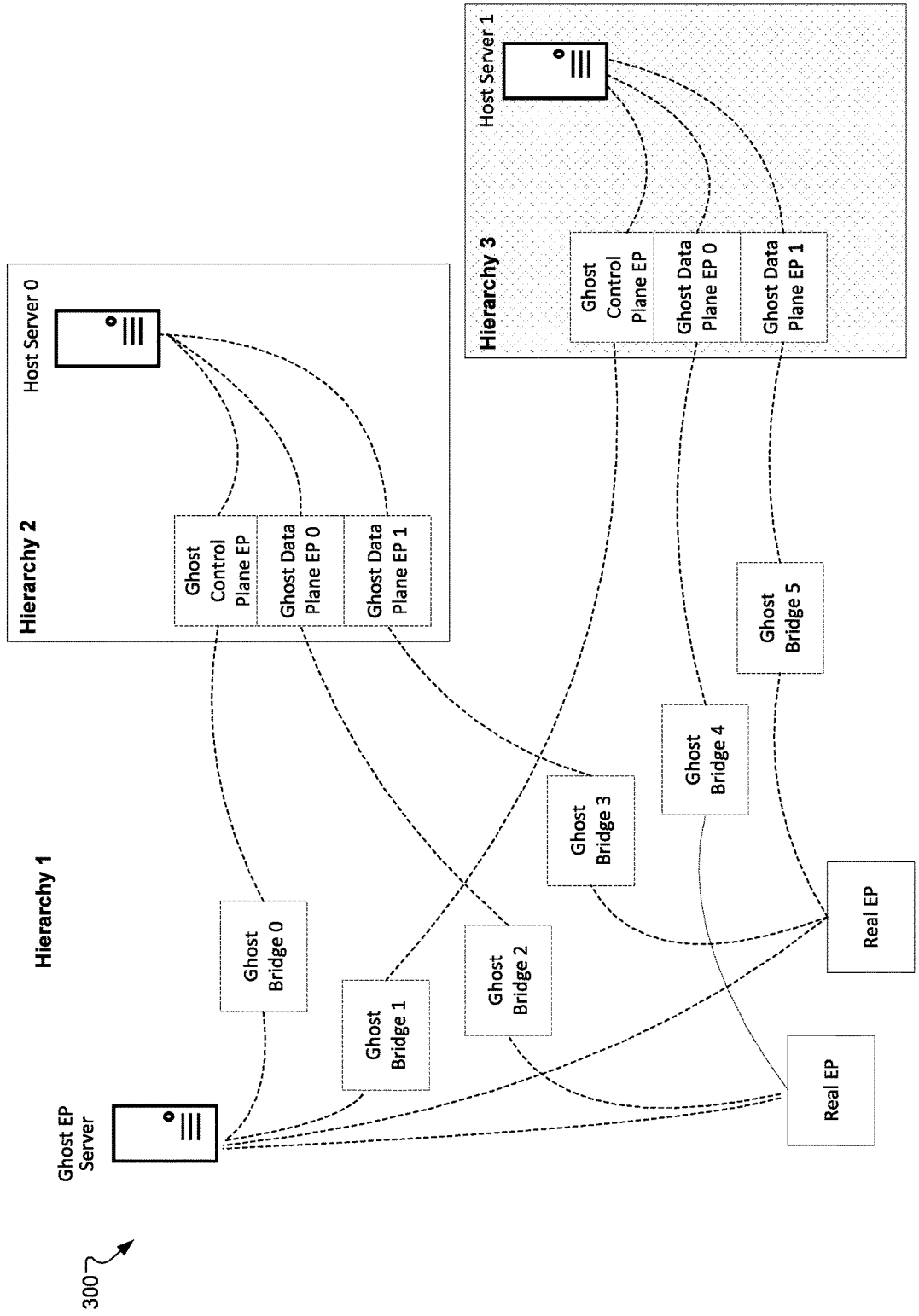
FIG. 3 illustrates exemplary CPU-implemented endpoints, according to some embodiments.

FIG. 3 illustrates an exemplary use case 300 of CPU-implemented endpoints. In this example, there are three different PCIe tree hierarchies. PCIe hierarchy 2 and PCIe hierarchy 3 are respectively represented by a box, while PCIe hierarchy 1 includes the rest of PCIe components. Each PCIe hierarchy or hierarchy includes a single server managing that hierarchy. Ghost devices are used to facilitate the communication between the host server and real PCIe endpoint devices. In the example of FIG. 3, the traffic may flow through an externally visible port on a PCIe switch.

As depicted, hierarchy 1 includes one host server, two real endpoint devices, and six ghost devices, which are respectively denoted as "ghost EP server," "real EP," and "ghost bridge." Hierarchy 2 includes one host (e.g., host server 0) and three ghost devices (e.g., ghost control plane EP). Hierarchy 3 includes one host (e.g., host server 1) and three ghost devices (e.g., ghost control plane EP). Although each of hierarchies 2 and 3 includes three ghost devices, it should be noted that the three ghost devices can be collapsed to appear as a single ghost device in other configurations.

In this example, each ghost device is paired with another ghost device in another PCIe tree. It should be noted that while this example shows 1:1 mapping for demonstrative purposes, the 1:1 mapping is not strictly necessary. The ghost devices are configured and used to provide device IDs, memory space (e.g., BAR space), and tag space for PCIe TLPs that bridge between PCIe hierarchies.

For TLPs moving between hierarchies, in some embodiments, the present PCIe switch may perform TLP match lookups to decide how to process an incoming TLP. For example, the TLP may be routed toward a ghost device that is matched for a specific rewrite rule. The TLP rewrite rules for ghost-directed TLPs may be used to modify each TLP, such that the TLP appears to originate from a ghost device in an appropriate PCIe hierarchy.

FIG. 3 can be used to illustrate an example doorbell transaction. Doorbell registers are used to send interrupts from one side of non-transparent bridge to the other. In this example, the host CPU in hierarchy 2 places a message in a shared memory region for another, e.g., the host CPU in hierarchy 1, to read and clear the interrupt. That is, host server 0 in hierarchy 2 writes a doorbell to its ghost device, and the ghost device triggers a descriptor fetch and a subsequent DMA fetch.

The example doorbell transaction starts with a doorbell ghost write. Host server 0 writes the doorbell in the BAR address of a ghost control plane EP, where the source ID (i.e., host server 0) and destination address (e.g., BAR address of ghost control plane EP) are within the same hierarchy 2. The PCIe switch performs packet forwarding by matching the target address range, and, based on the matching, generates a memory write TLP (e.g., PCIe MWr TLP). This TLP is a write to memory in the ghost EP server of hierarchy 1. The source ID of PCIe MWr TLP is modified to ghost control plane EP in hierarchy 1 such that the write request appears to come from a ghost device to bridge data exchange and communication between PCIe hierarchies. In some embodiments, the PCIe switch may also generate a write log entry and interrupt to aid in notification to the ghost EP server.

Responsive to receiving the PCIe MWr TLP, the ghost EP server of hierarchy 1 may perform a DMA request to fetch an appropriate descriptor from host server 0 of hierarchy 2, for example, using a cross-hierarchy DMA engine. Descriptors are stored in a descriptor table to initiate a DMA sequence and chain together multiple DMA sequences.

The ghost EP server of hierarchy 1 parses the descriptor fetched from hierarchy 2, and modifies the addresses in the descriptor such that the modified addresses can be later matched as the addresses of host server 0. In some embodiments, the modification includes configuring certain unused upper address bits. The ghost EP server inserts the descriptor (with modified addresses) into an appropriate location in its memory.

The ghost EP server of hierarchy 1 writes the appropriate doorbell/message to the real EP to process the request. The real EP of hierarchy 1 then fetches the descriptor in the ghost EP server with the modified address. Since both the real EP and ghost EP server reside in hierarchy 1, these operations are normal PCIe transactions within the same hierarchy. In this way, the doorbell write request initiated by host server 0 in hierarchy 2 to place a message in a shared memory region of hierarchy 1 is executed through the paired or matched ghost devices as if the host server/CPU is an endpoint.

The written message may be read by request. When requests for DMA ghost read and ghost completion are received, the real EP parses the descriptor and performs a DMA read of the specified address. This generates PCIe MRd requests out of the real EP. The PCIe MRd requests are matched by address and are then rewritten to addresses of host server 0 to be forwarded to host server 0 in hierarchy 2. These MRd requests' source IDs are modified to appear to come from the ghost data plane EP as if a normal PCIe transaction within hierarchy 2 is performed.

Example Use Case 2: Endpoints Virtual Function Distribution Across Hosts

In some embodiments, instead of implementing a PCIe endpoint through a host server, different virtual functions (VFs) of a PCIe endpoint may be distributed to host servers with direct communication. No routing through the host server that operates as the root complex for the PCIe endpoint (e.g., the real device) is needed.

Figure 4:
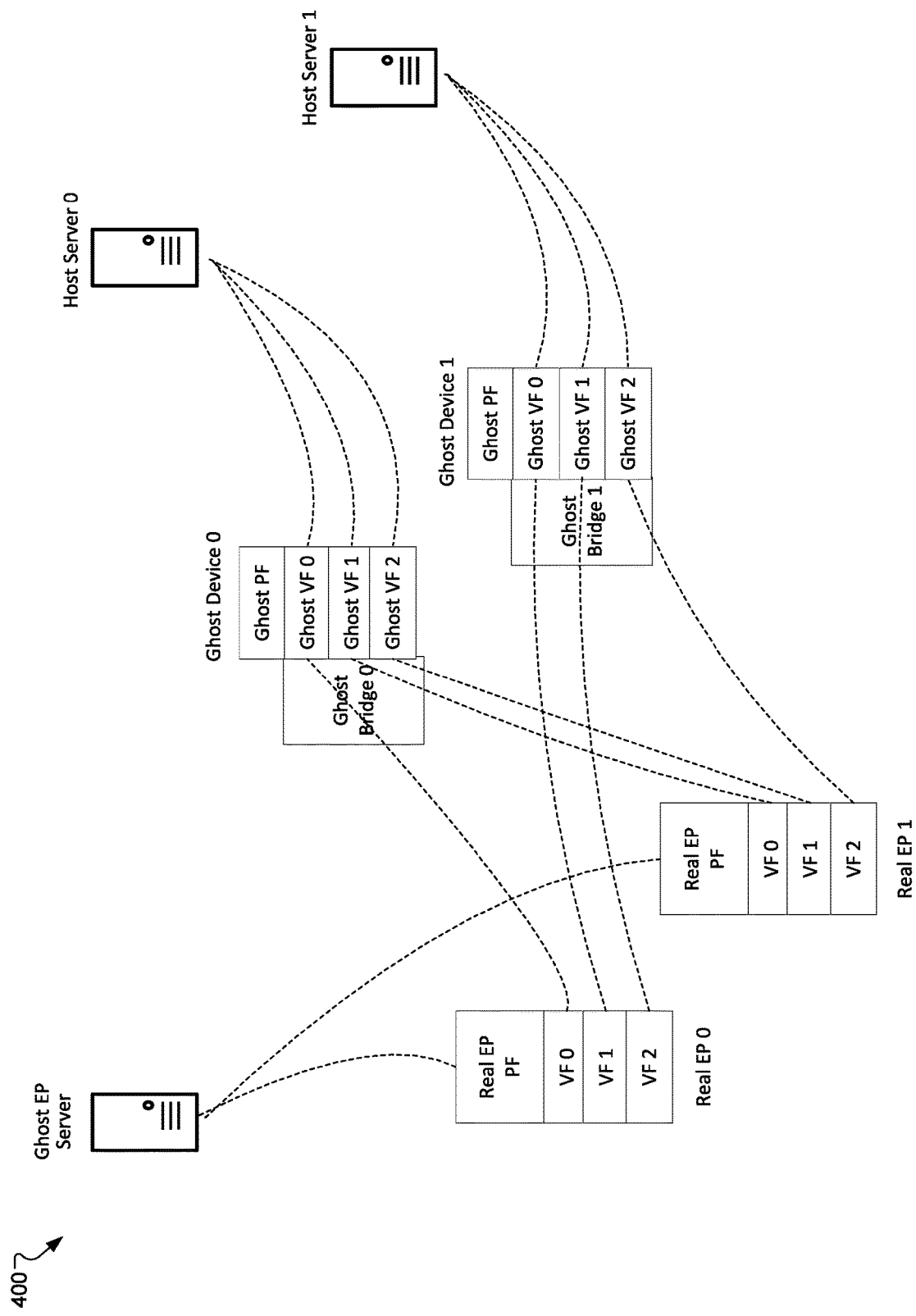
FIG. 4 illustrates exemplary endpoint virtual function distribution across hosts, according to some embodiments.

FIG. 4 illustrates an exemplary use case 400 comprising an endpoint VF distribution across hosts. As depicted, each host server (e.g., host server 0) is configured to connect to a ghost device (e.g., ghost device 0). Each ghost device is composed of ghost physical functions (PFs) and ghost virtual functions (VFs).

In some embodiments, when receiving a TLP from a host server (e.g., host server 0) to its ghost VF (e.g., ghost VF 0), the PCIe switch may match and rewrite the TLP to target a real VF (e.g., VF 0 of real EP 0) associated with the ghost VF and make the TLP appear to come from the corresponding ghost bridge (e.g., ghost bridge 0). The match and rewriting may be performed based on appropriate ID and address rewriting. In some embodiments, for non-posted TLPs, the PCIe switch may use tag rewriting to regenerate appropriate completion source IDs and tags. In this case, the TLPs from a host server in a hierarchy (e.g., host server 0) can be routed to a real endpoint in a different hierarchy (e.g., real endpoint 0) without involving the host server managing the real endpoint in the different hierarchy (e.g., ghost EP server).

Conversely, TLPs from a real VF (e.g., VF 0 of real EP 0) to a ghost bridge (e.g., ghost bridge 0) may be matched and rewritten to target an appropriate host server (e.g., host server 0) while appearing to come from the ghost VF (e.g., ghost VF 0). In this case, non-posted TLPs, however, do not require tag rewriting since the requester ID (source ID) is unique for that VF, and any later completions can be detected and routed appropriately.

Implementation System

FIG. 5 illustrates an exemplary server fabric adapter architecture 500 for accelerated and/or heterogeneous computing systems in a data center network. The server fabric adapter (SFA) 502 of FIG. 5 may be used to implement the flow control mechanism as shown in FIG. 2. In some embodiments, SFA 502 may connect to one or more controlling hosts 504, one or more endpoints 506, and one or more Ethernet ports 508. An endpoint 506 may be a GPU, accelerator, FPGA, etc. Endpoint 506 may also be a storage or memory element 512 (e.g., SSD), etc. SFA 502 may communicate with the other portions of the data center network via the one or more Ethernet ports 508.

In some embodiments, the interfaces between SFA 502 and controlling host CPUs 504 and endpoints 506 are shown as over PCIe/CXL 514a or similar memory-mapped I/O interfaces. In addition to PCIe/CXL, SFA 502 may also communicate with a GPU/FPGA/accelerator 510 using wide and parallel inter-die interfaces (IDI) such as Just a Bunch of Wires (JBOW). The interfaces between SFA 502 and GPU/FPGA/accelerator 510 are therefore shown as over PCIe/CXL/IDI 514b.

SFA 502 is a scalable and disaggregated I/O hub, which may deliver multiple terabits-per-second of high-speed server I/O and network throughput across a composable and accelerated compute system. In some embodiments, SFA 502 may enable uniform, performant, and elastic scale-up and scale-out of heterogeneous resources. SFA 502 may also provide an open, high-performance, and standard-based interconnect (e.g., 800/400 GbE, PCIe Gen 5/6, CXL). SFA 502 may further allow I/O transport and upper layer processing under the full control of an externally controlled transport processor. In many scenarios, SFA 502 may use the native networking stack of a transport host and enable ganging/grouping of the transport processors (e.g., of x86 architecture).

As depicted in FIG. 5, SFA 502 connects to one or more controlling host CPUs 504, endpoints 506, and Ethernet ports 508. A controlling host CPU or controlling host 504 may provide transport and upper layer protocol processing, act as a user application "Master," and provide infrastructure layer services. An endpoint 506 (e.g., GPU/FPGA/accelerator 510, storage 512) may be producers and consumers of streaming data payloads that are contained in communication packets. An Ethernet port 508 is a switched, routed, and/or load balanced interface that connects SFA 502 to the next tier of network switching and/or routing nodes in the data center infrastructure.

In some embodiments, SFA 502 is responsible for transmitting data at high throughput and low predictable latency between:
Network and Host;
Network and Accelerator;
Accelerator and Host;
Accelerator and Accelerator; and/or
Network and Network.

In general, when transmitting data/packets between the entities, SFA 502 may separate/parse arbitrary portions of a network packet and map each portion of the packet to a separate device PCIe address space. In some embodiments, an arbitrary portion of the network packet may be a transport header, an upper layer protocol (ULP) header, or a payload. SFA 502 is able to transmit each portion of the network packet over an arbitrary number of disjoint physical interfaces toward separate memory subsystems or even separate compute (e.g., CPU/GPU) subsystems.

By identifying, separating, and transmitting arbitrary portions of a network packet to separate memory/compute subsystems, SFA 502 may promote the aggregate packet data movement capacity of a network interface into heterogeneous systems consisting of CPUs, GPUs/FPGAs/accelerators, and storage/memory. SFA 502 may also factor, in the various physical interfaces, capacity attributes (e.g., bandwidth) of each such heterogeneous systems/computing components.

In some embodiments, SFA 502 may interact with or act as a memory manager. SFA 502 provides virtual memory management for every device that connects to SFA 502. This allows SFA 502 to use processors and memories attached to it to create arbitrary data processing pipelines, load balanced data flows, and channel transactions towards multiple redundant computers or accelerators that connect to SFA 502. Moreover, the dynamic nature of the memory space associations performed by SFA 502 may allow for highly powerful failover system attributes for the processing elements that deal with the connectivity and protocol stacks of system 500.

Figure 6:
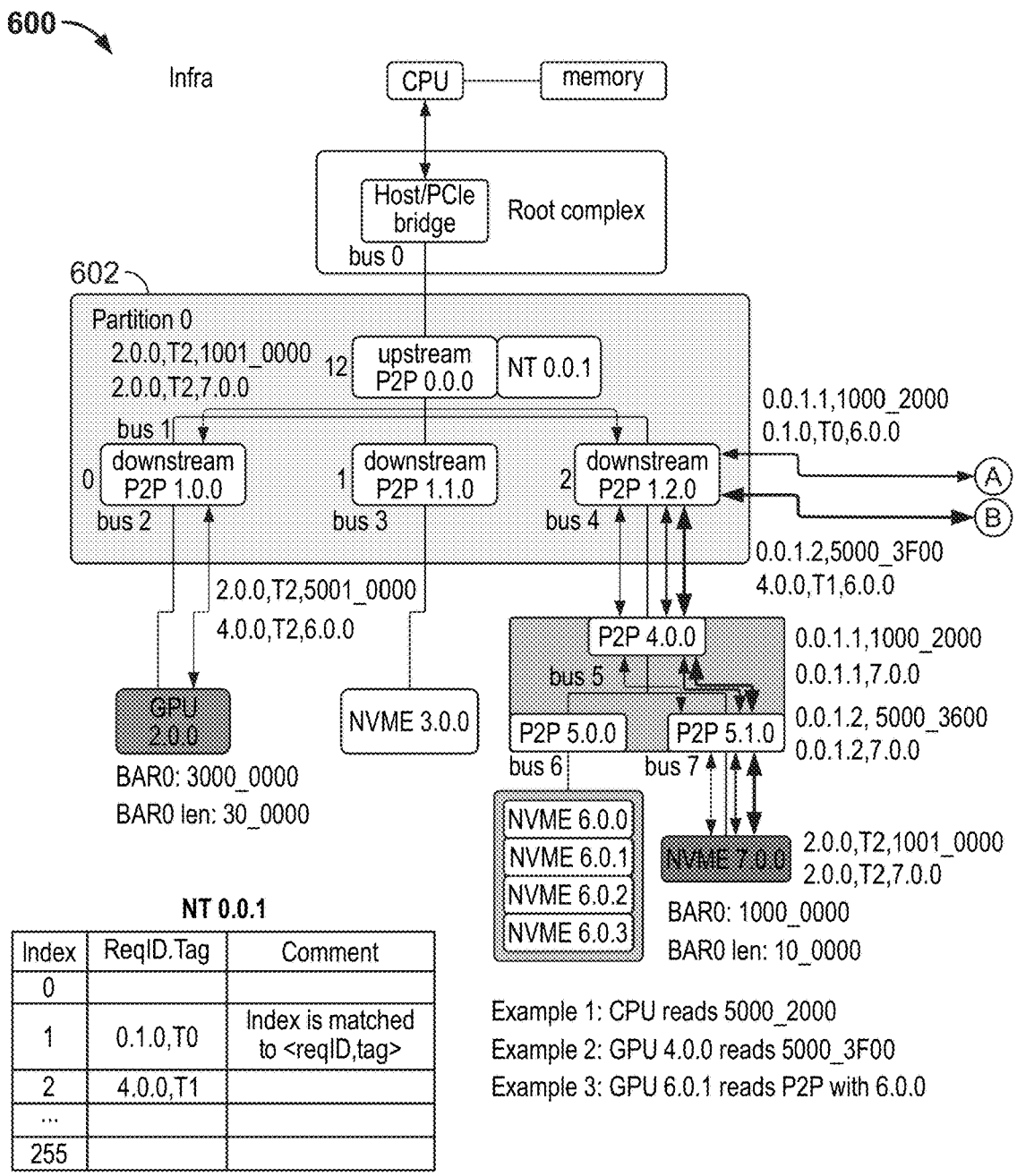
FIG. 6 illustrates an exemplary server with virtual versions of GPU and NVMe drive, according to some embodiments.
Figure 6:
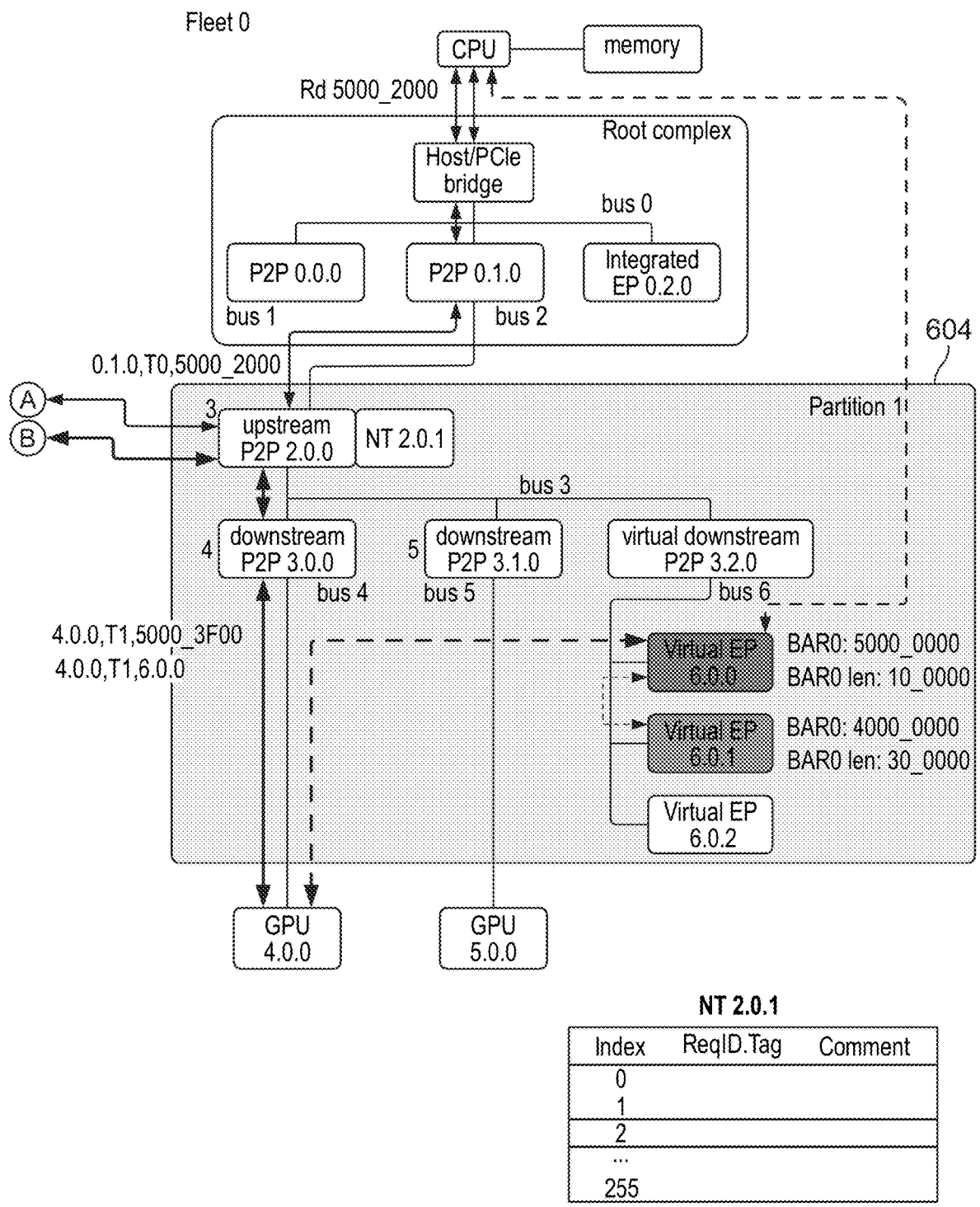

FIG. 6 illustrates an example of an "Infra" server 600 providing virtual/ghost versions of a graphics processing unit (GPU) and nonvolatile memory express (NVMe) drive to a "Fleet" server. Partitions 602 and 604 are sub-slices of a single switch chip presenting two independent PCIe hierarchies to their associated upstream servers. The example in FIG. 6 shows bus, device, and function number assignment within a standard PCIe hierarchy, as well as how the Fleet server can communicate with devices in a different hierarchy using virtual EP functions. In some embodiments, the accesses are remapped using specified match and/or action tables. As depicted, this server can also be used to properly handle virtual EP to virtual EP peer-to-peer TLPs by mapping these TLPs efficiently to real EP to real EP peer-to-peer transactions.

Flow Diagrams Using SFA

Figure 7:
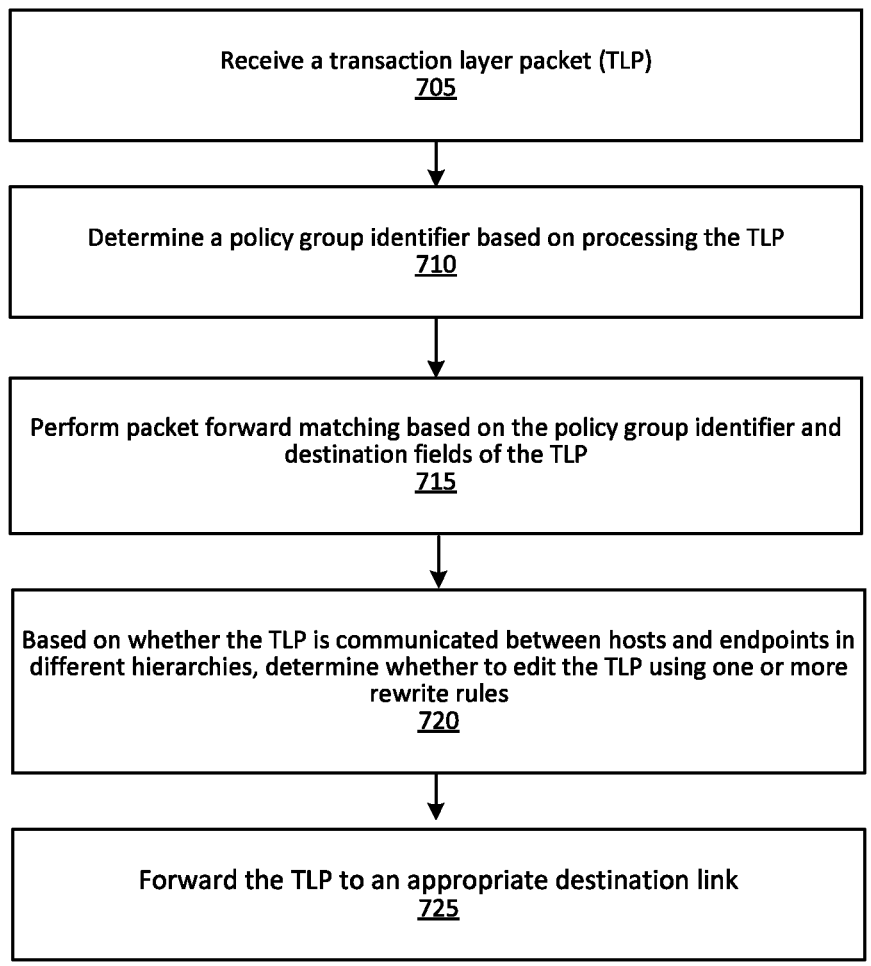
FIGS. 7-9 illustrate exemplary processes of sharing peripheral component interconnect express (PCIe) devices across multiple host servers, according to various embodiments.

FIG. 7 illustrates an exemplary process 700 of sharing peripheral component interconnect express (PCIe) devices across multiple host servers, according to some embodiments. In some embodiments, process 700 may be implemented by a PCIe switch (e.g., SFA in FIG. 5) in conjunction with the hosts and endpoints (as shown in FIGS. 3-4).

At step 705, the switch receives a transaction layer packet (TLP). The TLP can be a memory read or write request.

At step 710, the switch determines a policy group identifier based on processing the TLP. For example, the policy group identifier may be generated by compressing a source identifier of the TLP using a mapping function.

At step 715, the switch performs packet forward matching based on the policy group identifier and destination fields of the TLP. In some embodiments, the destination fields include a destination identifier, and the matching is performed based on the destination identifier and the policy group identifier. In other embodiments, the destination fields include a destination address field, and the matching is performed based on the destination address field and the policy group identifier.

At step 720, based on whether the TLP is communicated between the hosts and endpoints in different hierarchies of the plurality of hierarchies, the switch determines whether to edit the TLP using one or more rewrite rules. In some embodiments, editing the TLP includes one or more of rewriting a source identifier and tag of the TLP, rewriting a destination address or device identifier of the TLP, or rewriting a traffic class of the TLP At step 725, the switch forwards the TLP to an appropriate destination link.

Figure 8:
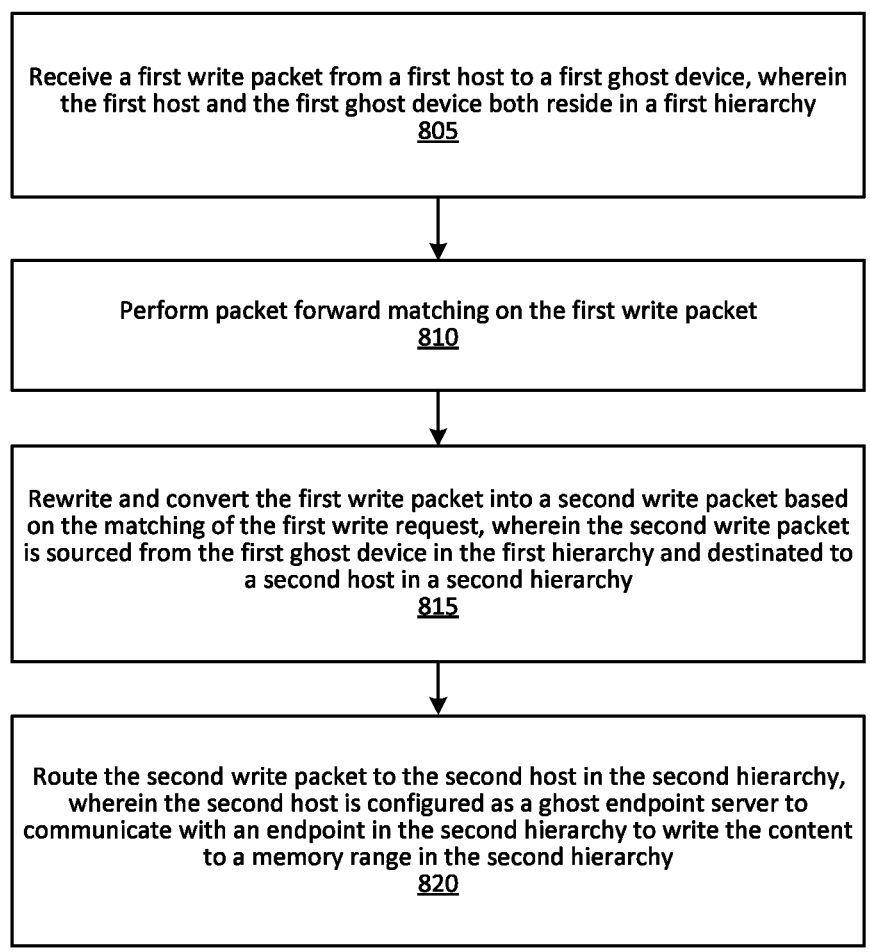

FIG. 8 illustrates an exemplary process 800 of sharing peripheral component interconnect express (PCIe) devices across multiple host servers such that a first host in a first hierarchy can write content to a memory range in a second hierarchy, according to some embodiments. In some embodiments, process 800 may be implemented by a PCIe switch (e.g., SFA in FIG. 5) in conjunction with the hosts and endpoints (as shown in FIGS. 3-4).

At step 805, the switch receives a first write packet from the first host to a first ghost device. The first host and the first ghost device both reside in the first hierarchy. A ghost device, including the first ghost device and a ghost endpoint server, is configured to provide device identifiers, memory space, and tag space for PCIe packets that bridge between different hierarchies.

At step 810, the switch performs packet forward matching on the first write packet. In some embodiments, a policy group identifier associated with a source identifier of the first write packet is determined, and the packet forward matching is performed based on the policy group identifier and destination fields of the first write packet.

At step 815, the switch rewrites and converts the first write packet into a second write packet based on the matching of the first write request. The second write packet is sourced from the first ghost device in the first hierarchy and destinated to the second host in the second hierarchy.

At step 820, the switch routes the second write packet to the second host in the second hierarchy. The second host is configured as a ghost endpoint server to communicate with an endpoint in the second hierarchy to write the content to the memory range in the second hierarchy.

Figure 9:
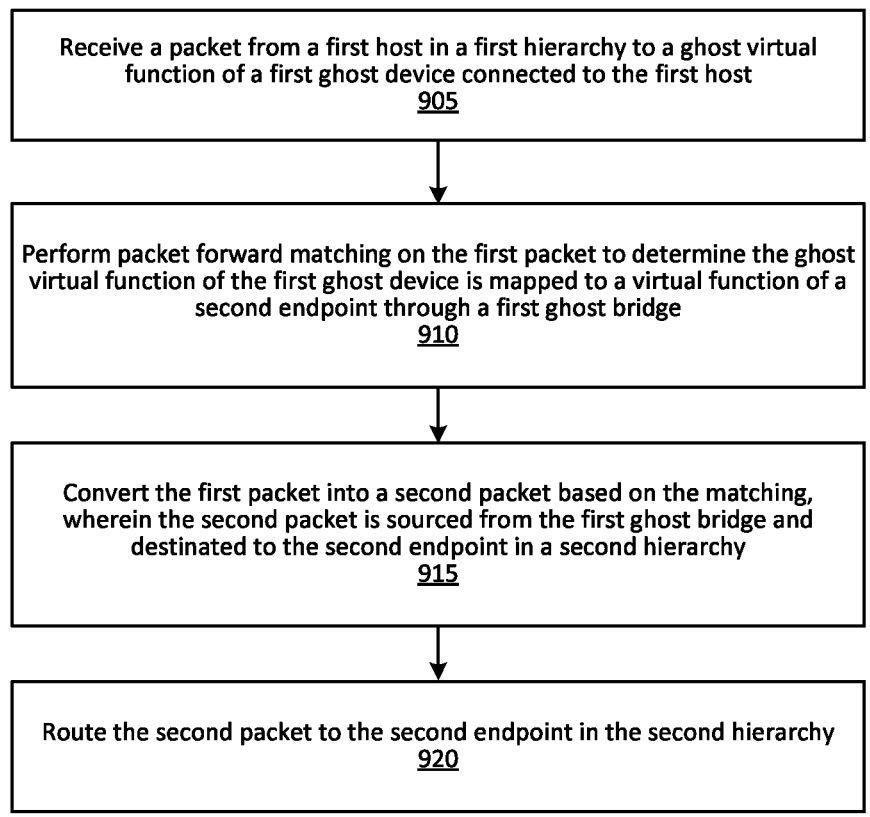

FIG. 9 illustrates an exemplary process 900 of sharing a peripheral component interconnect express (PCIe) device across multiple host servers without involving a host managing the PCIe device, according to some embodiments. In some embodiments, process 900 may be implemented by a PCIe switch (e.g., SFA in FIG. 5) in conjunction with the hosts and endpoints (as shown in FIGS. 3-4).

At step 905, the switch receives a packet from the first host in the first hierarchy to a ghost virtual function of a first ghost device connected to the first host. The first host of a plurality of hosts is associated with a first hierarchy in the plurality of hierarchies. Each host is connected to a ghost device, and each ghost device is composed of ghost physical functions and ghost virtual functions.

At step 910, the switch performs packet forward matching on the first packet to determine the ghost virtual function of the first ghost device is mapped to a virtual function of the second endpoint through a first ghost bridge.

At step 915, the switch converts the first packet into a second packet based on the matching, wherein the second packet is sourced from the first ghost bridge and destinated to the second endpoint in the second hierarchy.

At step 920, the switch routes the second packet to the second endpoint in the second hierarchy.

ADDITIONAL CONSIDERATIONS

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, for example as a server farm or a set of widely distributed servers, or may be implemented in a single computing device.

Although an example processing system has been described, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for sharing peripheral component interconnect express (PCIe) devices across multiple host servers comprising:
   a plurality of hosts associated with a plurality of hierarchies;
   one or more endpoints associated with one or more of the plurality of hierarchies; and
   a switch communicatively connectable to the plurality of hosts and the one or more endpoints, wherein the switch is configured to:
      receive a transaction layer packet (TLP);
      determine a policy group identifier based on processing the TLP;
      perform packet forward matching based on the policy group identifier and destination fields of the TLP;
      based on whether the TLP is communicated between the hosts and endpoints in different hierarchies of the plurality of hierarchies, determine whether to edit the TLP using one or more rewrite rules; and
      forward the TLP to an appropriate destination link.

2. The system of claim 1, wherein the switch is further configured to determine the policy group identifier by compressing a source identifier of the TLP using a mapping function to generate the policy group identifier.

3. The system of claim 1, wherein the destination fields include a destination identifier, and the matching is performed based on the destination identifier and the policy group identifier.

4. The system of claim 1, wherein the destination fields include a destination address field, and the matching is performed based on the destination address field and the policy group identifier.

5. The system of claim 1, wherein editing the TLP using the one or more rewrite rules further comprises one or more of rewriting a source identifier and tag of the TLP, rewriting a destination address or device identifier of the TLP, or rewriting a traffic class of the TLP.

6. The system of claim 5, wherein the TLP is a non-posted request, and the switch is further configured to:
   perform tag rewriting; and
   track an original tag and source identifier of the non-posted request based on the tag rewriting.

7. The system of claim 1, wherein the switch performs the packet forward matching using a ternary content addressable memory (TCAM) for long matches and fast lookups.

8. A system for sharing peripheral component interconnect express (PCIe) devices across multiple host servers such that a first host in a first hierarchy can write content to a memory range in a second hierarchy, the system comprising:
   a plurality of hosts associated with a plurality of hierarchies, the plurality of hosts including the first host and a second host respectively associated with the first hierarchy and the second hierarchy in the plurality of hierarchies;
   one or more endpoints associated with one or more of the plurality of hierarchies; and
   a switch communicatively connectable to the plurality of hosts and the one or more endpoints, wherein the switch is configured to:
      receive a first write packet from the first host to a first ghost device, wherein the first host and the first ghost device both reside in the first hierarchy;
      perform packet forward matching on the first write packet;

rewrite and convert the first write packet into a second write packet based on the matching of the first write request, wherein the second write packet is sourced from the first ghost device in the first hierarchy and destinated to the second host in the second hierarchy; and route the second write packet to the second host in the second hierarchy, wherein the second host is configured as a ghost endpoint server to communicate with an endpoint in the second hierarchy to write the content to the memory range in the second hierarchy.

9. The system of claim 8, wherein ghost devices, including the first ghost device and the ghost endpoint server, are configured to provide device identifiers, memory space, and tag space for PCIe packets that bridge between the plurality of hierarchies.

10. The system of claim 9, wherein the switch is further configured to:
map a ghost device in a hierarchy with a different ghost device in a different hierarchy, including mapping the first ghost device in the first hierarchy to the ghost endpoint server or second host in the second hierarchy through a ghost bridge, and
wherein the packet forward matching is performed based on mappings between the ghost devices.

11. The system of claim 10, wherein the mapped ghost devices enable bridging ghost transactions between independent hierarchies of the plurality of hierarchies.

12. The system of claim 8, wherein the first write request is converted into the second write packet using one or more rewrite rules, and the second write packet is routed to the ghost endpoint server that is matched for a specific rewrite rule.

13. The system of claim 8, wherein the switch is configured to perform the packet forward matching on the first write packet by:
determining a policy group identifier associated with a source identifier of the first write packet; and
performing the packet forward matching based on the policy group identifier and destination fields of the first write packet.

14. The system of claim 8, wherein the switch is further configured to:
rewrite a traffic class of the first write packet when converting the first write packet to the second write packet.

15. The system of claim 8, wherein the switch is further configured to perform DMA ghost read and ghost completion based on address field rewriting.

16. A system for sharing a peripheral component interconnect express (PCIe) device across multiple host servers without involving a host managing the PCIe device, the system comprising:
a plurality of hosts associated with a plurality of hierarchies, the plurality of hosts including a first host associated with a first hierarchy in the plurality of hierarchies, wherein each host is connected to a ghost device, and each ghost device is composed of ghost physical functions and ghost virtual functions;
one or more endpoints associated with one or more of the plurality of hierarchies, the one or more endpoints including a second endpoint in a second hierarchy of the plurality of hierarchies; and
a switch communicatively connectable to the plurality of hosts and the one or more endpoints, wherein the switch is configured to:
receive a packet from the first host in the first hierarchy to a ghost virtual function of a first ghost device connected to the first host;
perform packet forward matching on the first packet to determine the ghost virtual function of the first ghost device is mapped to a virtual function of the second endpoint through a first ghost bridge;
convert the first packet into a second packet based on the matching, wherein the second packet is sourced from the first ghost bridge and destinated to the second endpoint in the second hierarchy; and
route the second packet to the second endpoint in the second hierarchy.

17. The system of claim 16, wherein the first packet is a non-posted transaction layer packet, and to convert the first packet to the second packet, the switch is further configured to:
use tag rewriting to regenerate a completion source identifier and tag.

18. A method for sharing peripheral component interconnect express (PCIe) devices across multiple host servers comprising:
receiving a transaction layer packet (TLP);
determining a policy group identifier based on parsing and processing the TLP;
performing packet forward matching based on the policy group identifier and destination fields of the TLP;
based on whether the TLP is communicated between the hosts and endpoints in different hierarchies of the plurality of hierarchies, determining whether to edit the TLP using one or more rewrite rules; and
forwarding the TLP to an appropriate destination link.

19. The method of claim 18, wherein the destination fields include a destination identifier, and the matching is performed based on the destination identifier and the policy group identifier.

20. The method of claim 18, wherein the destination fields include a destination address field, and the matching is performed based on the destination address field and the policy group identifier.

21. A method for data access via PCIe between a plurality of hosts and a plurality of endpoints, the method comprising performing, at a ghost endpoint server, steps of:
designating for each host a respective control-plane ghost bridge for exchanging control information with any of the plurality of endpoints via the ghost endpoint server; and
designating for each host-endpoint pair a respective data-plane ghost bridge, wherein respective addresses of the data-plane ghost bridges are modified addresses, uniquely identifying for each host-endpoint pair, a destination of a data communication between the host-endpoint pair.

22. The method of claim 21, wherein the respective destination of the data communication is an endpoint belonging to the respective host-endpoint pair, or a respective host belonging to the respective host-endpoint pair.

23. The method of claim 21, further comprising:
associating with at least one host, a ghost control plane for exchanging control information with a corresponding control-plane ghost bridge.

24. The method of claim 21, further comprising:
associating with at least one host, a plurality of ghost data planes, for exchanging data with respective data-plane ghost bridges.

25. A method for providing to a plurality of hosts access to a plurality of virtual functions (VFs) implemented at a plurality of endpoints, the method comprising:
- designating a respective ghost bridge for each host, wherein each ghost bridge:
  - exposes one or more VFs from one or more of the plurality of endpoints as a set of ghost virtual functions (GVFs) to the corresponding host, and
  - maps each GVF to a corresponding VF; and
- translating and forwarding a request from a host to execute a particular GVF exposed by the corresponding ghost bridge to a corresponding VF at one of the plurality of endpoints.

26. The method of claim 25, wherein a ghost bridge corresponding to a particular host exposes only a subset of VFs from one of the plurality of endpoints.

\* \* \* \* \*